Sept. 17, 1946.    M. SCHWARTZ ET AL    2,407,687
RANGE FINDER
Filed Dec. 28, 1943
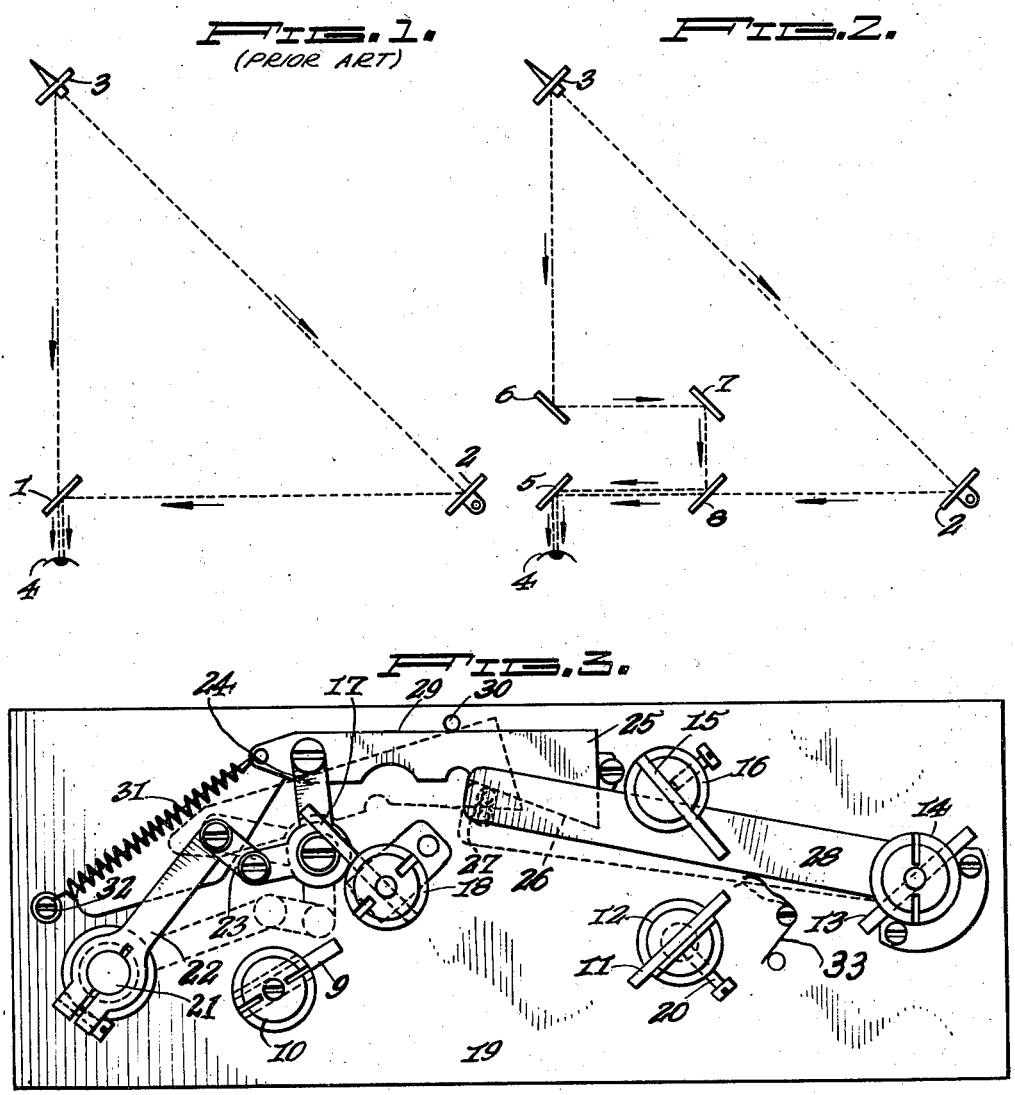
INVENTOR.
MORRIS SCHWARTZ and
BY WILLIAM CASTEDELLO
Frederick E. Hahn
ATTORNEY Patented Sept. 17, 1946

2,407,687

UNITED STATES PATENT OFFICE 2,407,687

RANGE FINDER

Morris Schwartz and William Castedello, Stamford, Conn., assignors to The Kalart Company, Inc., Stamford, Conn.

Application December 28, 1943, Serial No. 515,882

8 Claims. (Cl. 88—2.7)

1

Our invention relates to improvements in range finders in which two images of a single object are brought into a predetermined relative position to each other in order to determine the distance of the viewed object. Our invention relates more particularly to improvements in range finders in which the distances between an object and the reflectors of the range finder reflecting said images are unequal in an operative position of the range finder. Our invention relates still more particularly to range finders of the type described to be used in connection with photographic cameras.

With range finders of the type described, the two images of the observed object as appearing to the eye of an observer, are not of equal size particularly if the distance between object and range finder is relatively short. This difference in the sizes of the images makes an adjustment of the range finder very difficult. It also affects the accuracy of the range finder.

The principal object of our invention is to provide novel means by which the error factor caused by the different sizes of the produced images is substantially eliminated or compensated. This important advantage is accomplished by including an optical detour in the path of the light travelling from the object toward the reflector of the range finder closer to the object in an operative position of the range finder, thus substantially equalizing the optical lengths of the paths between an object to be viewed and the reflectors of the range finder.

Another more specific object of our invention is to eliminate said error factor substantially by providing a reflector arrangement in the path of the light travelling from the object toward the reflector closer to the object in an operative position of the range finder by which reflector arrangement, the optical length of this path is extended or increased to substantially the length of the path of the light travelling from the object directly to the reflector more removed from the object in an operative position of the range finder and projected by this reflector upon the other reflector.

Other and further objects of our invention will appear hereinafter and in the appended claims forming part of the specification.

Our invention is applicable to and useful for all types of range finders in which the distances between an object to be viewed and the reflectors of the range finders are unequal, as it is the case with range finders in which the point of observation is in a position other than the center of the

2 axis between the reflectors of the range finders, irrespective of whether a "superimposing image" or a "split image" system or other separating image systems are employed and whether the movable reflector is controlled by hand, by movements of a camera lens or by adjustment of other parts of a camera.

In the accompanying drawing forming a part of this specification:

Fig. 1 is a diagram of a conventional range finder of any separating image type, Fig. 2 is a diagram of a reflector arrangement according to the invention for a range finder of any separating image type, and Fig. 3 is a detailed view of a range finder equipped with a reflector arrangement according to the invention on an enlarged scale.

Like numerals are employed to designate like parts throughout the drawing and the specification.

The diagram of the conventional range finder shown in Figure 1, comprises a stationary semi-transparent reflector 1, for example, a mirror made semi-transparent by silver coating the surface of the mirror only partially or thinly and a movable reflector 2, for example, a mirror having a solidly silvered surface. The movable reflector may be manually adjusted, for example, by means of a screw arrangement or by a coupling with the lens carrier or any other suitable part of a camera as it is well known in the art. The object whose distance from the range finder is to be measured is designated by the number 3 and the position of the eye of an observer using the range finder by the number 4. The windows conventionally arranged in front of the reflectors and the observation window are not shown.

One image of object 3 is projected by movable reflector 2 upon the viewing face of stationary reflector 1. A second image of the object is viewable directly on this reflector due to the semi-transparency of this reflector. By adjusting movable reflector 2, both images can be brought in register. This can be used in a manner well known in the art to indicate either the distance between object 3 and the range finder or to focus the camera lens in case of camera coupled range finders.

As it is apparent from Figure 1, the distance between object 3 and stationary semi-transparent reflector 1 is substantially shorter than the distance between object 3 and movable reflector 2 plus the distance between reflectors 2 and 1. It should be noted in this connection that range finders of the type described are only operative if object 3, reflector 1 and position of the eye 4 of the observer are substantially in alignment. Such position is referred to as "operative position" herein. Consequently, the size of an image of the object viewed directly on reflector 1, is larger than the size of the image projected upon this reflector from movable reflector 2. The difference in the distances and hence in the size of the images is more pronounced for a shorter distance than for a greater distance between the object and the range finder. As previously explained, this difference in size of the two images to be brought in register with superimposing image range finders or to be placed in a proper relative position with split-image range finders, may make the correct adjustment of a range finder difficult or practically impossible, especially at very short distances, and affect the accuracy of the indication or adjustment of the range finder.

Fig. 2 illustrates a diagram of a range finder according to our invention. This range finder comprises a stationary reflector 5, for example, a mirror having a solidly silvered surface, an adjustable reflector 2, for example, a mirror having a solidly silvered surface, and a reflector arrangement including a stationary reflector 6 such as a mirror having a solidly silvered surface, a second stationary reflector 7 such as a mirror having a solidly silvered surface and a stationary semi-transparent reflector 8 such as a mirror having a partially or thinly silvered surface. As it appears from Figure 2, reflector 6 will intercept a beam of light travelling from object 3 toward reflector 5 and project it upon reflector 7 which in turn will project it upon semi-transparent reflector 8 which will finally project the image of the object upon the viewing face of stationary reflector 5 in erect position. The second image of object 3 is projected by adjustable reflector 2 upon reflector 5 after passing through semi-transparent reflector 8.

As previously explained, the optical effect of the reflector arrangement comprising reflectors 6, 7 and 8 is to increase the optical distance between object 3 and reflector 5. In other words, the reflector arrangement according to the invention is forming an "optical detour." The effect of this detour is to equalize approximately the optical distances between object 3 and the reflectors. Consequently, the two images projected upon reflector 5 will have substantially the same sizes so that the previously outlined difficulties of adjustment of the range finder are practically eliminated.

In practice, it is advisable to place reflector 7 and semi-transparent reflector 8 approximately on a line through the center of the axis between reflectors 2 and 5. We have found that this location of the reflectors will effect a satisfactory compensation of the error factor for all practical purposes.

A further improvement of the correction obtained by the optical detour can be accomplished by making reflectors 7 and 8 adjustable in axial direction. Such correction is desirable under special circumstances such as in macro photography.

As it will appear from the previous explanation, our invention is not limited to the reflector arrangement shown in Figure 2. It is only essential to provide an optical detour substantially compensating the differences in distance between an object and the reflectors of the range finder. It is, for instance, possible to use a greater number of reflectors than shown which deflect the beam of light several times before the image is finally projected upon the reflector on which the two images are viewed, for example one or more additional pairs of reflectors 6 and 7 may be used. It is further possible to use any suitable reflecting means such as prisms instead of mirrors.

Fig. 3 shows a detail view of a range finder of the superimposing image type according to the invention.

The range finder shown in Figure 3 comprises a stationary reflector 9, supported on a holder 10, a stationary reflector 11 supported on a holder 12, a pivotal reflector 13 supported on a holder 14, a stationary reflector 15 supported on a holder 16 and a stationary reflector 17 supported on a holder 18. The holders may be fastened by any suitable means to the housing 19 or any other suitable part of the range finder. The reflectors can be mounted in any suitable manner upon their holders. The reflectors may be mounted in guiding slots permitting a transversal adjustment of the reflectors. The reflectors may be adjusted in their positions by set screws 20 or similar means.

Reflectors 9, 13, 15 and 17 may be mirrors having a solidly silvered surface or prisms. Reflector 11 is semi-transparent; it may consist of a mirror, the surface of which is only partially or thinly silver coated. The angular position of reflector 13 may be controlled by any suitable means. In the embodiment shown in Figure 3, the angular position of reflector 13 is controlled by a rotation of a shaft 21 which in turn may be controlled by the adjustment of the lens carrier of a camera. However, it should be noted that our invention is by no means limited to the illustrated adjustment of reflector 13. Shaft 21 carries an arm or lever 22 which is fastened to shaft 21 by any suitable means. A second lever 23 is pivoted to the free end of lever 22, the other end of which is pivotally connected to a pivotal lever 24, which in turn pivotally engages a guiding bar or compensator 25. Compensator bar 25 is provided with a wedge or slanted surface 26, which engages a pin or projection 27 of a lever or bar 28 fastened to pivotal reflector 13. The upper edge 29 of compensator bar 25 is guided by a projection or lug 30 fastened to housing 19. A spring 31 fastened at one end to compensator bar 25 and at the other end to housing 19 by means of a screw 32 or similar means. Spring 31 tends to hold compensator bar 25 in engagement with lug 30, and a second spring 33 urges pin 27 of bar 28 in engagement with the slanted surface 26 of compensator bar 25. If shaft 21 is rotated, moving lever 22 into the position indicated in Figure 3 in dotted lines, the various parts of the lever arrangement will assume the positions shown in dotted lines. The slanted surface 26 of compensator bar 25 will force lever or bar 28 into the position indicated in dotted lines and the angular position of reflector 13 will be correspondingly changed.

The optical detour according to our invention is formed by the three reflectors 17, 15 and 11.

A range finder according to our invention may be equipped with conventional windows and other accessories. However, these parts are not shown since they are not part of our invention or essential for the understanding of the invention.

One image of an object whose distance from the range finder is to be determined will be projected by reflector 13 upon reflector 9 passing through semi-transparent reflector 11. A second image of the object will be projected by reflector 17 upon reflector 15. This reflector will project the second image upon semi-transparent reflector 11, which in turn will project the second image upon reflector 9. An observer whose eye is in a proper position opposite reflector 9 can view both images on reflector 9 and bring these two images in register by adjustment of the angular position of reflector 13.

Since the operation of a range finder according to the invention is conventional, no detailed description of its operation is deemed necessary. The optical effect of the repeated reflection of one of the images has been described in detail in connection with Figure 2.

Our invention shall not be limited to the embodiment shown but various changes and alterations may be made without departing from the scope of our invention.

What we claim as new and desire to secure by Letters Patent is as follows:

1. Range finder of the type described comprising a stationary reflector, an adjustable reflector arranged to project an image of an object exterior to the range finder upon said stationary reflector, means for adjusting said adjustable reflector, and a reflector arrangement for projecting a second image of said object upon said stationary reflector, said reflector arrangement including three reflectors, the first one being placed in the direct path of the light travelling from the object toward the stationary reflector, the second and third reflectors being placed outside of the direct path of light travelling from the object toward the stationary reflector, the first reflector projecting the second image upon the second one, the second reflector projecting the second image upon the third one and the third reflector projecting the second image upon the stationary reflector, the reflectors of said reflector arrangement being arranged to equalize the lengths of the optical paths between the adjustable reflector and the stationary reflector and between said first reflector of the reflector arrangement and the stationary reflector.

2. Range finder of the type described comprising a stationary reflector, an adjustable reflector arranged to project an image of an object exterior to the range finder upon said stationary reflector, means for adjusting said adjustable reflector, and a reflector arrangement for projecting a second image of said object upon said stationary reflector, said reflector arrangement including a reflector placed in the path of light travelling from an object to be viewed in the range finder toward said stationary reflector, a second reflector placed laterally of said first reflector and a third semi-transparent reflector placed in the axis between said stationary reflector and said adjustable reflector, the reflectors of said reflector arrangement being arranged in an optical relation for projecting an image of the object upon said stationary reflector, the reflectors of said reflector arrangement being arranged to equalize the lengths of the optical paths between the adjustable reflector and the stationary reflector and between said first reflector of the reflector arrangement and the stationary reflector.

3. Range finder of the type described comprising a stationary reflector, an adjustable reflector arranged to project an image of an object exterior to the range finder upon said stationary reflector, a reflector arrangement for projecting a second image of said object upon the stationary reflector, said reflector arrangement including a reflector placed in the path of the light travelling from an object to be viewed in the range finder toward said stationary reflector, a second reflector placed laterally of the first reflector and a third semi-transparent reflector placed in the axis between said stationary reflector and said adjustable reflector, the reflectors of said reflector arrangement being arranged in an optical relationship for projecting an image of the object upon the stationary reflector and to equalize the lengths of the optical paths between the adjustable reflector and the stationary reflector and between the first reflector of the reflector arrangement and the stationary reflector, a pivotal lever, means for controlling the pivotal position of said lever and a second lever operatively coupled with the first lever and connected to the adjustable reflector for controlling the angular position of the adjustable reflector without affecting the relative lengths of the optical paths between the reflectors of the range finder.

4. Range finder comprising a stationary reflector, a reflector arranged to project an image of an object exterior to the range finder to the stationary reflector, a reflector arrangement for projecting a second image of said object to the stationary reflector, said reflector arrangement including three reflectors, the first one being placed in the direct path of light travelling from the object toward the stationary reflector, the second and third reflectors being placed outside of the direct path of light travelling from the object toward the stationary reflector, the first reflector projecting the second image to the second one, the second reflector projecting the second image to the third one and the third reflector projecting the second image to the stationary reflector, the reflectors of said reflector arrangement being arranged to equalize the lengths of the optical paths between the stationary reflector and the first mentioned image projecting reflector and between said first reflector of the reflector arrangement and the stationary reflector.

5. Range finder of the type described comprising a stationary reflector, a reflector arranged to project an image of an object exterior to the range finder to said stationary reflector, a reflector arrangement for projecting a second image of said object to said stationary reflector, said reflector arrangement including a reflector placed in the path of light travelling from an object to be viewed in the range finder toward said stationary reflector, a second reflector placed laterally of said first reflector and a third semi-transparent reflector placed in the axis between said stationary reflector and said first mentioned image projecting reflector, the reflectors of said reflector arrangement being arranged in an optical relation for projecting the second image of the object to said stationary reflector, and being also arranged to equalize the lengths of the optical paths between the stationary reflector and the first mentioned image projecting reflector and between the first reflector of the reflector arrangement and the stationary reflector, a means for pivotally supporting one of the reflectors other than the stationary one, and a means for varying the angular position of said pivotal reflector.

6. Range finder of the type described comprising a stationary reflector, an adjustable reflector arranged to project an image of an object exterior to the range finder to said stationary reflector, a reflector arrangement for projecting a second image of said object to said stationary reflector, said reflector arrangement including three reflectors, the first one being placed in the direct path of light travelling from the object toward the stationary reflector, the second and third reflectors being placed outside of the direct path of light travelling from the object toward the stationary reflector, the first reflector projecting the second image to the second one, the second reflector projecting the second image to the third one and the third reflector projecting the second image to the stationary reflector, said reflectors of the reflector arrangement being arranged in an optical relationship for projecting the second image of the object to the stationary reflector and to equalize the lengths of the optical paths between the adjustable reflector and the stationary reflector and between the first reflector of the reflector arrangement and the stationary reflector, a pivotal lever, a means for controlling the pivotal position of said lever, and a second lever operatively coupled with the first lever and connected to the adjustable reflector for controlling the angular position of the adjustable reflector without affecting the relative lengths of the optical paths between the reflectors of the range finder.

7. Range finder of the type described comprising a stationary reflector, an adjustable reflector arranged to project an image of an object exterior to the range finder to said stationary reflector, a reflector arrangement for projecting a second image of said object to said stationary reflector, said reflector arrangement including three reflectors, the first one being placed in the direct path of light travelling from the object toward the stationary reflector, the second and third reflectors being placed outside of the direct path of light travelling from the object toward the stationary reflector, the first reflector projecting the second image to the second one, the second reflector projecting the second image to the third one and the third reflector projecting the second image to the stationary reflector, said reflectors of the reflector arrangement being arranged in an optical relationship for projecting the second image of the object to the stationary reflector and to equalize the lengths of the optical paths between the adjustable reflector and the stationary reflector and between the first reflector of the reflector arrangement and the stationary reflector, a pivotal lever having a section forming a wedge, a second lever fastened to the adjustable reflector, said wedge section being arranged to slidably engage said second lever, and a means to adjust the angular position of the pivotal lever thereby controlling the angular position of the adjustable reflector without affecting the relative lengths of the optical paths between the reflectors of the range finder.

8. Range finder of the type described comprising a stationary reflector, an adjustable reflector arranged to project an image of an object exterior to the range finder to said stationary reflector, a reflector arrangement for projecting a second image of said object to the stationary reflector, said reflector arrangement including a reflector placed in the path of light travelling from an object to be viewed in the range finder toward said stationary reflector, a second reflector placed laterally of the first reflector and a third semi-transparent reflector placed in the axis between said stationary reflector and said adjustable reflector, the reflectors of said reflector arrangement being arranged in an optical relationship for projecting the second image of the object to the stationary reflector and to equalize the lengths of the optical paths between the adjustable reflector and the stationary reflector and between the first reflector of the reflector arrangement and the stationary reflector, a pivotal lever, means for controlling the pivotal position of said lever, a second lever fastened to the adjustable reflector, a third lever pivotally connected to the first lever and having a section forming a wedge, said wedge section being arranged to slidably engage said second lever for controlling the angular position of the adjustable reflector without affecting the relative lengths of the optical paths between the reflectors of the range finder, the angle of the wedge section causing a ratio of transmission of movement varying corresponding to a displacement of the point of engagement between said wedge section and the second lever.

MORRIS SCHWARTZ.
WILLIAM CASTEDELLO.